United States Patent [19]

Ricchiuti

[11] Patent Number: 5,054,668
[45] Date of Patent: Oct. 8, 1991

[54] CAR TRUNK CARRIER TRAY

[76] Inventor: Patrick J. Ricchiuti, 11235 Oakleaf Ave., #1201, Silver Spring, Md. 20901

[21] Appl. No.: 544,645

[22] Filed: Jun. 27, 1990

[51] Int. Cl.$^5$ ............................................. B60R 11/00
[52] U.S. Cl. ................................ 224/42.42; 224/311; 296/37.1; 206/818; 220/528; 220/533
[58] Field of Search ............... 224/42.42, 42.43, 42.44, 224/309, 311, 906, 328; 296/37.1, 37.16; 206/818, 335; 220/500, 528, 529, 533

[56] References Cited

U.S. PATENT DOCUMENTS

| | | | |
|---|---|---|---|
| 1,901,533 | 3/1933 | Preddey | 206/561 X |
| 2,504,222 | 4/1950 | Otto | 220/564 X |
| 2,747,959 | 5/1956 | Ingelson | 220/533 X |
| 2,985,333 | 5/1961 | Kirkman | 220/533 |
| 3,473,680 | 10/1969 | Downer | 224/311 X |
| 3,986,656 | 10/1976 | November | 224/42.42 X |
| 4,136,904 | 1/1979 | Lauderdale | 296/37.1 |
| 4,226,348 | 10/1980 | Dottor et al. | 224/42.42 |
| 4,303,367 | 12/1981 | Bott | 220/506 X |
| 4,363,402 | 12/1982 | Grzyll | 206/818 X |
| 4,416,483 | 11/1983 | Koch | 224/311 X |
| 4,512,503 | 4/1985 | Gioso | 224/42.42 |
| 4,660,880 | 4/1987 | Bensch | 296/37.1 |
| 4,821,931 | 4/1989 | Johnson | 224/311 X |
| 4,832,242 | 5/1989 | Leek | 224/311 |
| 4,884,733 | 12/1989 | Geeves | 224/311 |
| 4,944,544 | 7/1990 | Dick | 296/37.1 |

FOREIGN PATENT DOCUMENTS

| | | | |
|---|---|---|---|
| 3106116 | 12/1982 | Fed. Rep. of Germany | 296/37.16 |
| 1565411 | 5/1969 | France | 220/528 |

Primary Examiner—Ernest G. Cusick
Assistant Examiner—Glenn T. Barrett
Attorney, Agent, or Firm—Robert Halper

[57] ABSTRACT

A brightly colored semi-trapezoidal car trunk carrier tray made of plastic having a plurality of compartments some of which are adjustable in size by use of inclined insertable slats, some compartments having restraining modules for stabilizing the position of large or odd sized articles, spaced hangers on at least one side of the tray, a fastener and a recessed magnet on the bottom of the tray and sectionalizing the tray to make it smaller or larger.

15 Claims, 4 Drawing Sheets

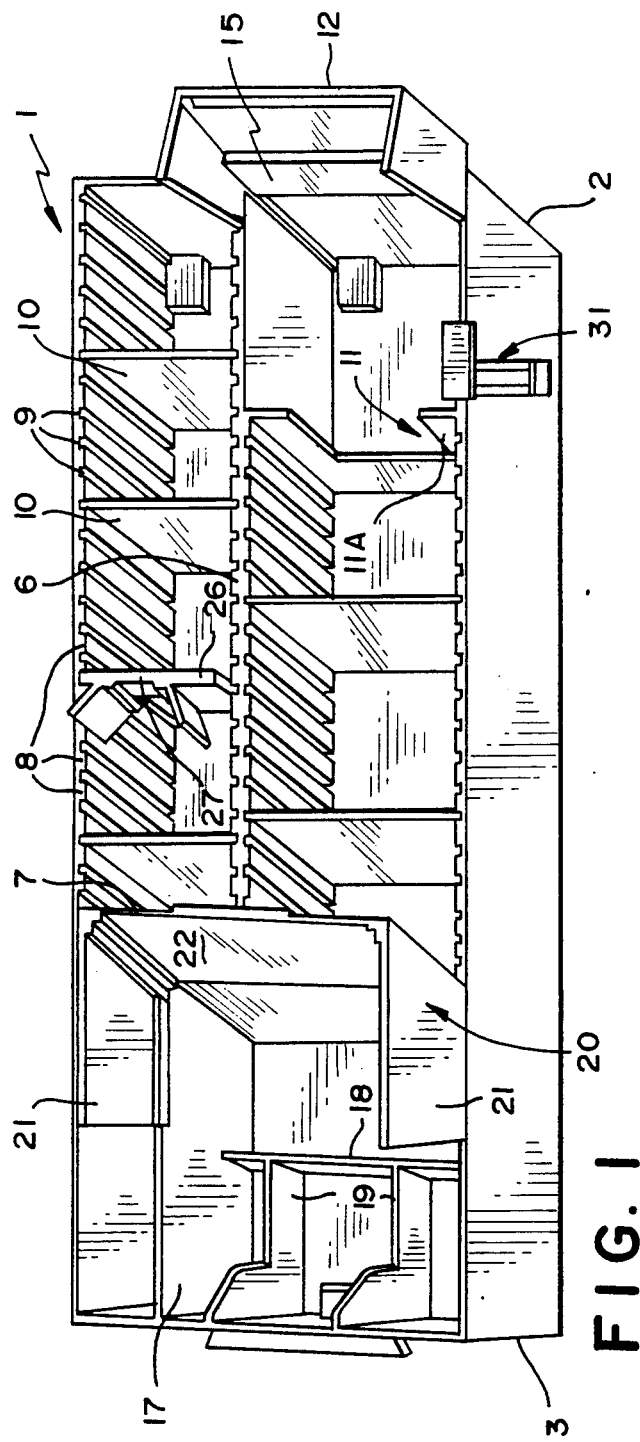
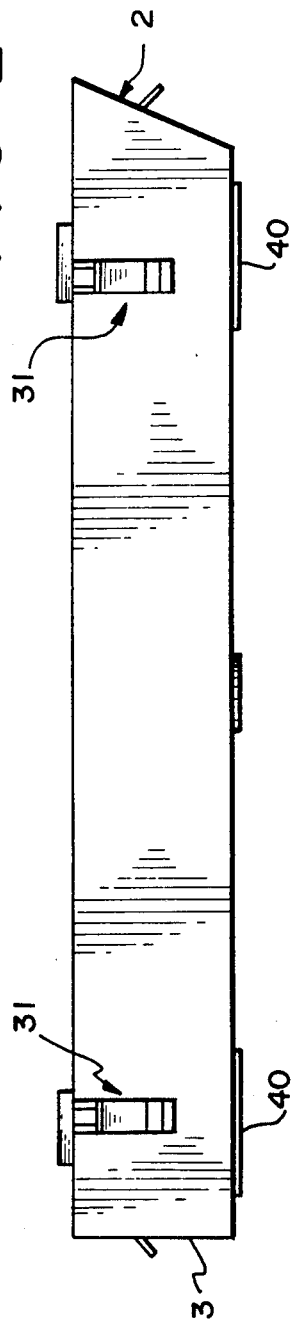

CAR TRUNK CARRIER TRAY

BACKGROUND OF THE INVENTION

This invention relates to a carrier tray for the trunk of a vehicle and is an improvement over applicant's Design Application No. 07/446716 filed on 12/6/89.

The tray is designed to store a variety of objects of different size and shape and the arrangement is such that the carrier tray is fastened to the floor of the trunk at any convenient location.

The prior art is replete with vehicular storage devices. For example a rigid compartmentalized cellular structure of metal for use in a truck is illustrated by U.S. Pat. Nos. 2,504,222. 3,473,680 teaches a tray fastened to the trunk cover of a car for clothes. U.S. Pat. No. 4,136,904 is illustrative of a tool and storage box located under the hood and affixed to the internal surface of a fender wheelcover. A similar design for an automobile is taught by U.S. Pat. Nos. 4,660,880. 4,416,483 is another arrangement showing two triangular trays attached to an automobile cover for tools. U.S. Pat. Nos. 4,303,367, and 4,540,213 are examples of containers fastened to vehicular floors designed for carrying shopping bags. U.S. Pat. No. 4,512,503 teaches an all purpose vehicle organizer which is attached to a vehicle seat using a hook and pile fastener. This organizer has a slidable upper tray and a lower tray, both having a plurality of fixed compartments for holding cans, drinking cups, coin, pens, cassettes, cigarettes, etc. U.S. Pat. Nos. 2,747,959, and 2,985,333 are examples of compartmentalized trays having slats that are selectively insertable into grooves to adjust compartment spaces and U.S. Pat. No. 1,901,533 shows a receptacle having inclined partitions.

SUMMARY OF THE INVENTION

It is an object of the present invention to provide a carrier tray to be fastened to the trunk floor of a vehicle which is designed to carry a variety of different type articles, none of which seem to have been contemplated by the prior art. For example, some of the articles are gallon jugs, a paper roll, cleaning fluids, oils, brake fluid, anti-freeze, spray paint, polish, as well as tools, a squeegee and an ice scraper. The arrangement is unique in that it has greater flexibility than car trays of the prior art. This is effectuated by providing inserts that can be selectively insertable at various positions to accommodate objects of different dimensions. There are also several fixed spaces for containing specific items such as gallon jugs. Such items are further secured by use of restraining modules that slide over fixed slats or rigid end walls at designated positions. To facilitate easy removal from the tray all items are arranged to fit into the tray in inclined position. Adjacent at least one side of the tray is arranged a pair of hangers to hold an ice scraper or squeegee or both. To facilitate portability on each end wall is an inclined extension that serves as a handle. The tray is of light weight, preferably of plastic material and of bright color or painted with a fluorescent dye or luminous paint so that in the event of car failure, particularly loss of electric power, the tray can be taken from the trunk and put on the roof of the car or the trunk door to serve as a beacon for oncoming vehicles. To this end a permanent magnet is placed in a recess at the bottom of the tray. The tray can be simply fastened to the fabric of the trunk floor by use of a strip of hook and loop pile fastener, glued to the bottom of the tray. In addition to using a strip of fastener, a plurality of adjustable bolts can be mounted in the front or rear of the tray, the same resting on the trunk floor. This addition is particularly useful in vehicles that have floors inclined from the back to the front or vice versa. While the tray is of compact design and takes up little space, in the event only a few items need be carried, the tray can be separated into sections to make it either narrower and/or shorter. By the sametoken the tray can be enlarged to make it wider and/or longer.

BRIEF DESCRIPTION OF THE DRAWINGS

FIG. 1 is a perspective view of the tray showing selectively insertable and fixed slats.

FIG. 2 is a side view of the tray showing its shape and having hangers mounted on the side wall.

DETAILED DESCRIPTION OF THE INVENTION

Figure 3:
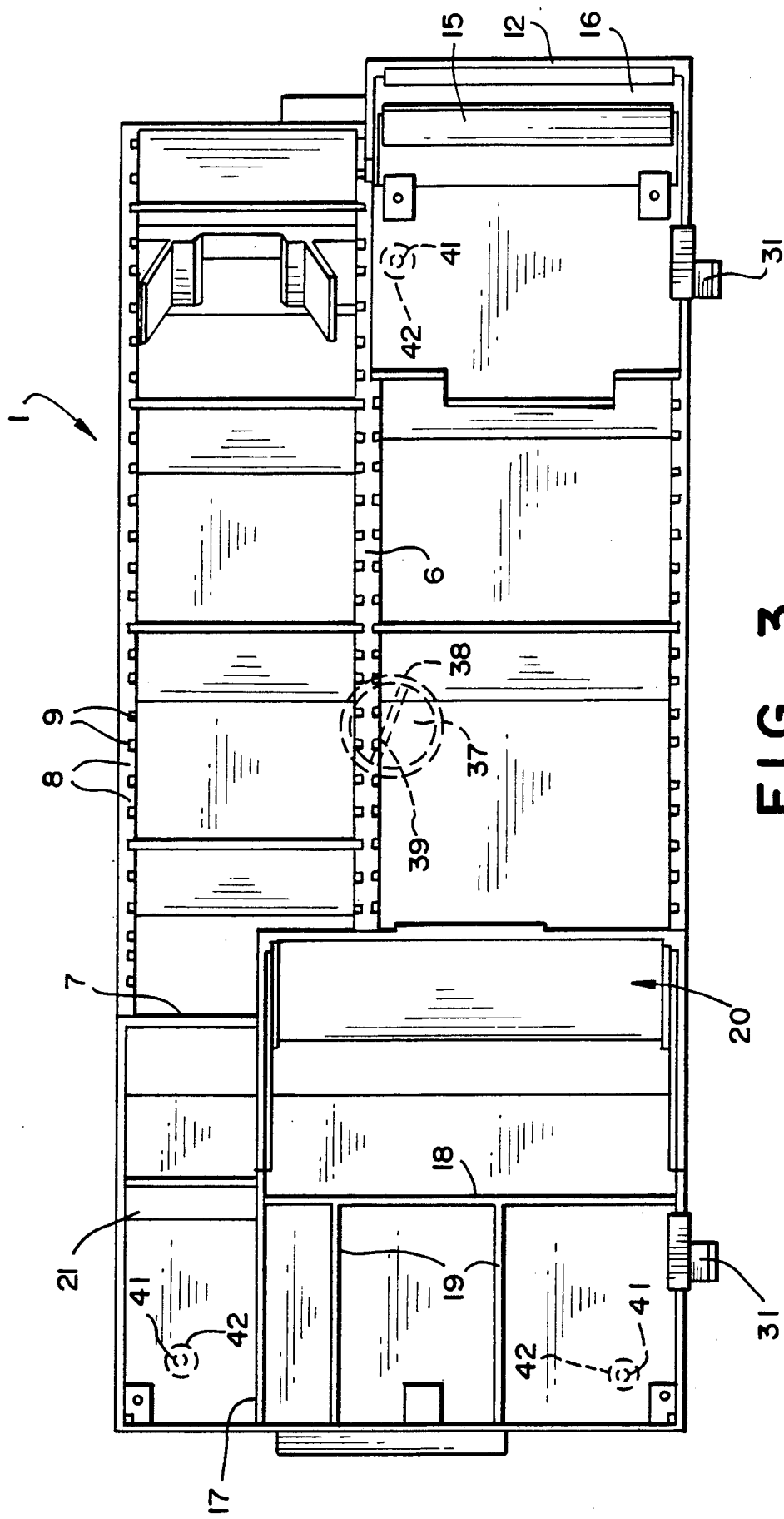
FIG. 3 is a plan view of the tray showing the location of restrainer modules.
Figure 4:
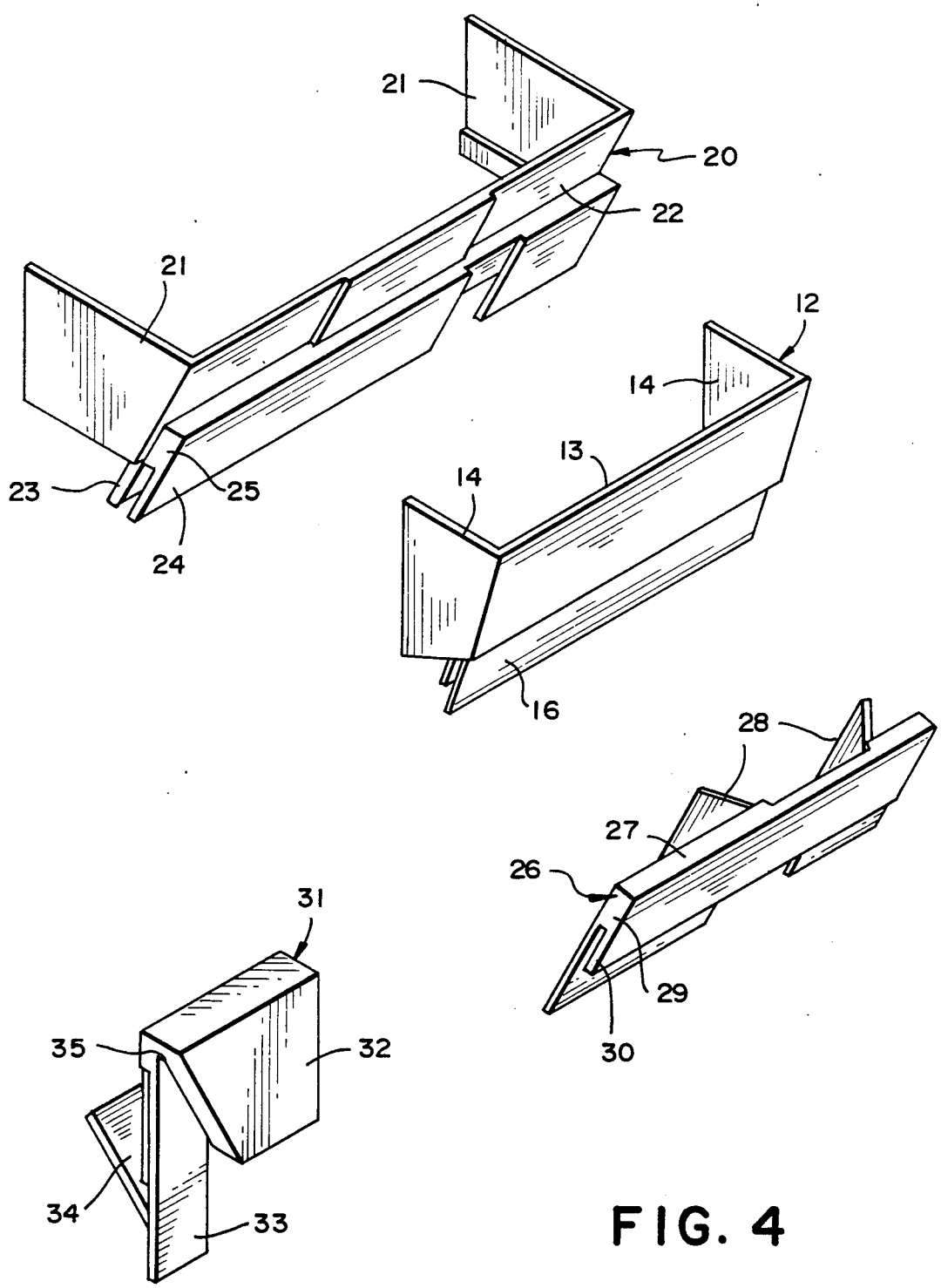
FIG. 4 is an enlarged view of the modules and hangers.
Figure 5:
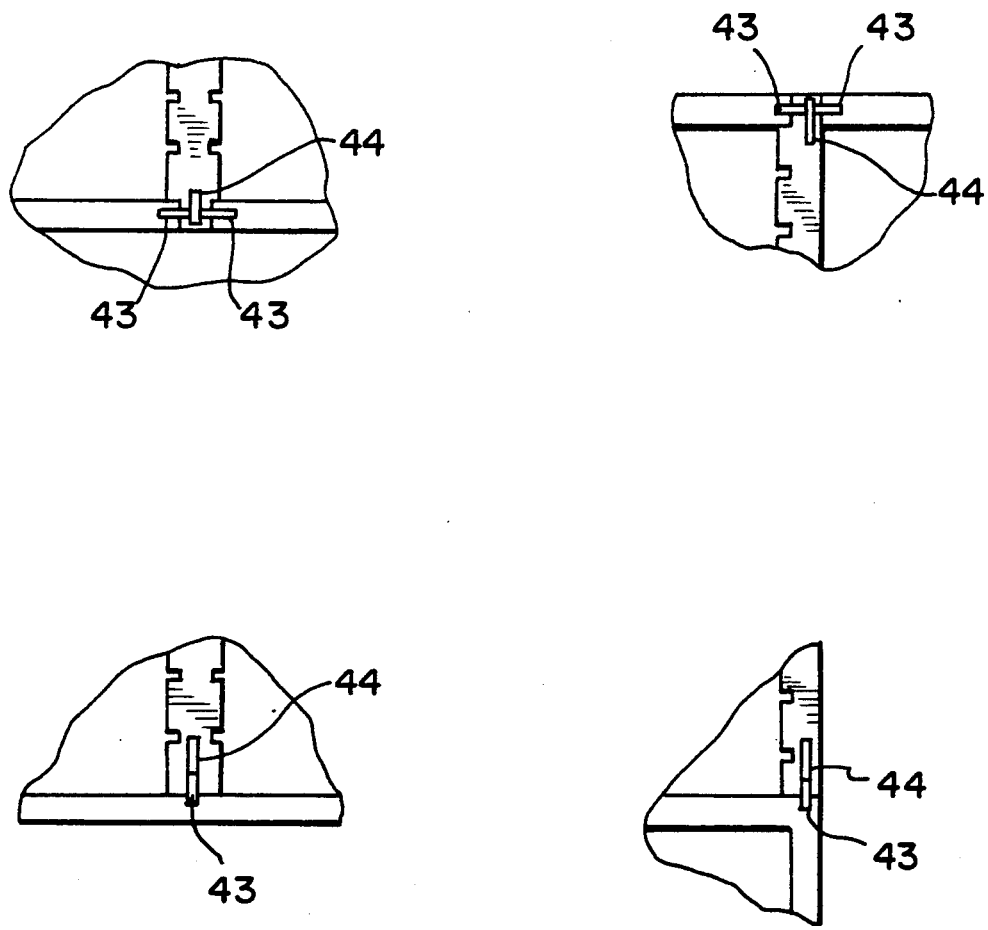
FIG. 5 is a view showing sectioning of the tray both longitudinally and transversely.

The car carrier tray of this invention is a semi trapezoidal member 1 about 20 inches in length, 8 inches wide and 3 inches in depth. The tray comprises a inclined front wall 2 a vertical rear wall 3, vertical side walls 4 and a flat bottom 5. The material is preferably a plastic such as plexi-glass or any other thermosetting plastic and is tinted a bright color such as orange or coated with a luminous paint or fluorescent dye. A first divider 6 is arranged parallel to the side walls and extends from the inner side of the front wall to a second divider element 7 extending transversely between the side walls, being of greater thickness than the first divider and the respective walls and located some distance longitudinally of the rear wall. Fixed on the side walls and on each side of the first divider is a plurality of spaced inclined ribs 8 forming grooves 9 into which slats 10 can be selectively placed depending on the size of the item to be contained. The inclinations of the front wall and ribs are at the same angle. On one side of the first divider is a front pocket defined by an inclined fixed slat 11, a section of the inclined front wall and a section of one side wall. The inclined slat has a rectangular cutout made so as to produce a U with two straight legs 11a. The purpose of this cutout is to accommodate a fair size cylindrical item whose circumferential edge might extend beyond the fixed space of the defined pocket. In this region there are no spaced ribs on the divider. To the front wall section a restrainer module 12 can be removably attached. The module extends some height above the normal height of the tray and aids in securing and stabilizing large size cylindrical objects like a roll of paper. The module is a three sided cradle like piece having a reinforced front wall 13 and two side walls 14 inclined only at their lower ends from the front to rear. A rectangular plate 15 is attached inwardly to the lower end of the module front wall by a spacer strip 16 so that a slit is formed. The module can then slide down over the tray front wall wherein one of the side walls of the module rests on the tray side wall and the other rests on the divider. In the rear the transverse divider and the one side wall and a fixed slat 17 spaced laterally inwardly of the other side wall define a rear pocket. The floor of this pocket is reinforced by a inclined slat 18 extending parallel to the second divider between the one side wall and fixed slat 17. This slat is further braced by two slats 19 of the same height extending in parallel between the one side wall and fixed slat 17. These slats extend to the rear and intermediate their ends rise vertically upwardly and form an arc that joins the rear wall to which they are fastened. This pocket in conjunction with a restraining rear module 20 is designed to give support for large heavy gallon containers. Adjacent the rear pocket is a narrow compartment divided into sections by a fixed inclined slat 21. This slat is of greater height than the adjacent slat in the rear pocket and is parallel but not concurrent therewith. This sectioned compartment is designed for small objects like screws, nuts, bolts, spark plugs, feeler gauges, etc. The aforementioned restrainer module 20 is similar to the front restrainer module and is generally coincident therewith. However module 20 has side walls 21a longer than those of the front module and an inclined rear wall 22 with one side wall resting on the tray side wall and the other resting on the fixed slat 17. The inclined rear wall of this module has two paced rectangular plates 23 and 24 attached outwardly to the lower region of the inclined rear wall by a thickened spacer strip 25. Between the respective plates is a rectangular space so that when the module slides down over the second divider it can fit over the first divider without interference. Like in the front pocket there are no spaced ribs in this region. A third restrainer module 26 comprises a vertical wall 27 and outwardly angled side walls 28. As in the other modules to the rear of the vertical wall is attached a spacer strip 29 for mounting a plate 30 so that the module can selectively fit over one of the insertible slats on the side of the tray opposite the location of the other modules. This restrainer module is made to accommodate smaller cylindrical objects or odd sized containers. On one of the tray side walls 4 are positioned two spaced hangers 31. The hangers are channel-shaped having one angled leg 32 fitting on the inside of the sidewall and a longer and narrower leg 33 fitting on the exterior of the side wall. Attached to the lower edge of the longer leg is a an outwardly inclined plate 34 which forms a nook for carrying such items as squeegees or ice scrapers. To enable portability each end of the tray has a small downwardly inclined strip 35 that serves as a handle. In the tray bottom there is a small circular threaded recess 36 in which is placed a permanent magnet 37. Under normal traveling conditions this magnet is covered with a threaded disc 38 having a slight groove 39 that facilitates turning. In the event of car trouble while traveling at night and particularly with power failure, the tray can be lifted out of the trunk, the disc removed and the tray can be magnetically attached to the roof or the trunk door of the car. As mentioned earlier the bright color or the luminous paint can serve as a beacon for oncoming cars. Bonded also to the bottom of the tray is a strip of hook and pile material 40 for fastening the tray to the fabric of the trunk floor. Additionally 3 spaced holes might be drilled in the tray adjacent the front or rear wall to accommodate three bolts 41 whose ends could be fitted with skirts 42 so that the bolts could rest on the trunk floor. This option would be especially useful if as in some vehicles the trunk floor slopes from the rear to the front or vice versa. While the tray is of compact design and takes up little space, in the event that only a few items are to be carried, the tray can be sectioned both transversely and longitudinally. To make the tray narrower both front wall, rear wall and second divider can be sectioned on a line coincident with one set of ribs of the first divider. Each of the sectioned regions can be slotted and into one of the slots of each section an iron liner 43 can be inserted. In a corresponding aligned slot of the sectioned region a magnetic iron strip 44 can be inserted. To make the tray shorter the two side walls and the parallel fixed slat can be severed at the second divider. The same iron liner as above can be inserted into slots in respective severed ends of the side walls and corresponding magnets as above can be inserted into the other severed ends of the side walls. It is obvious that both longitudinally and transversely the sections will be magnetically held in place until an occasion might arise when a smaller tray would be desirable and accordingly the sections would be readily separated by breaking the magnetic bond at the point of juncture. Although not shown the tray could be enlarged both longitudinally and transversely by adding liners and magnetic strips at appropriate places.

In summary it is believed that a uniquely designed car carrier tray has been developed to accommodate a variety of articles not hitherto contemplated. Not only is there adjustability in the size of the compartments, but because of the inclination of the slats, there is ease of removal of a wanted item. The tray is of light weight and portable and also has use other than as a carrier, for example as a beacon. Finally the tray can be sectionalized so that only a few items need be carried or enlarged to increase the carrying capacity.

What is claimed is:

1. A vehicle having a trunk floor covered with fabric having carrier tray adapted to fit into the trunk of (a) said vehicle, wherein said tray comprises a semi-trapezoidal like member having one vertical side wall, and another vertical side wall, said side walls having inner and outer sides, an inclined front wall, having an inner and an outer side, a vertical rear wall and a flat bottom, having an underside, a first divider element having two sides, arranged in parallel relationship to said side walls and extending a certain distance from the inner side of the front wall to a second divider extending transversely between said side walls, a non adjustable front pocket defined by said inclined front wall, said one side wall, and said first divider and an inclined fixed slat having respective ends between said one side wall and said first divider, a non adjustable rear pocket defined by said second divider said one and said other side wall and said rear wall, a plurality of (compartments) bracing members in said rear pocket comprising fixed slats running transversely and longitudinally, a plurality of spaced inclined ribs mounted on said two sides of said first divider and one the respective inner sides of said one and said other side wall, said ribs on said one side wall extending between said front pocket and said rear pocket, said ribs on said other side wall extending for the same said distance as the ribs on the divider, said ribs defining grooves, a plurality of slats selectively insertable into said grooves to form compartments of various sizes, a cradle shaped front restraining module having a slotted lower portion for engaging said inclined front wall, a larger cradle shaped rear restraining module having a slotted lower portion for engaging said second divider and an intermediate restraining module for selectively engaging one of said insertable slats, said modules comprising an intermediate wall section and opposing end walls, a strip of hook and pile material secured at said underside of said bottom for fastening said tray to the fabric of the trunk floor.

2. The tray of said claim 1 wherein said fixed slat of the front pocket as a rectangular cut out intermediate its ends and said second divider is of greater thickness than said first divider.

3. The tray of claim 2 wherein said rear pocket is defined by said one sidewall the second divider and a fixed slat spaced latterly inwardly from said other side wall.

4. The tray of claim 3 wherein said bracing members include a reinforcing slat fastened to the bottom of the tray parallel and rearwardly and of less height than said second divider.

5. The tray of claim 4 wherein said rear pocket is further reenforced by a pair of slats of comparable height to said reenforcing slat and perpendicular thereto and extending rearwardly and of less height than said second divider.

6. The tray of claim 5 wherein said fixed slat of said rear pocket forms a narrow compartment with said other side wall said compartment being further divided by a transverse slat of low height as compared to that of said other side wall.

7. The tray of claim 1 wherein said tray is made of a colored plastic having a luminous quality.

8. The tray of claim 7 wherein said bottom (portion) of said tray contains a circular recessed portion and a permanent magnet is bonded therein.

9. The tray of claim 1 wherein handles are positioned at (each) said front end and said rear end of the tray and channel like hangers with unequal legs are mounted on one of said side walls at spaced points.

10. The tray of claim 9 wherein the larger of said legs overlaps said side wall and an inclined arm extends outwardly from said larger leg.

11. The tray of claim 1 wherein said front module comprises a vertical wall and side walls extending inwardly and angularly (at their lower ends), a plate fastened inwardly of said vertical wall by a spacer strip to form a slot so that said module can fit over said fixed slot of said front pocket, said rear module having an inclined wall and extending side walls of greater length than said side walls of said front module, said (intermediate) intermediate module having a vertical center wall and two outwardly angled side walls.

12. The tray of claim 1 having means to disassemble said tray both longitudinally and transversely.

13. The tray of claim 12 wherein said tray is sectioned along a line extending from the front wall to the rear wall and through the second divider at a point of intersection with one set of ribs of the first divider a slot in each respective sectioned region of said front wall, rear wall and second divider an iron liner inserted in one of said slots of each sectioned region and a corresponding aligned magnetic strip placed in the other of said slots of said sectioned region said tray being disassembled longitudinally by breaking the magnetic bonds at the points of sectioning.

14. The tray of claim 12 wherein said tray is sectioned along a line extending transversely across said side walls and said fixed slat at the point of juncture with said second divider a slot in each sectioned region of said side walls an iron liner placed in one of said slots of said sectioned side walls and a corresponding aligned magnetic strip in the other of said slots of said sectioned side walls said tray being disassembled transversely by breaking the magnetic bonds at the point of sectioning.

15. A car having a trunk floor, a compact plastic car carrier tray having means to fasten said tray to (the) said trunk floor (of said car), said tray having side walls with inner and outer sides and a bottom and being coated with a luminous paint, a plurality of inclined compartments of variable size and a number of compartments of fixed size, a plurality of restraining modules of varied size and having means to fit over said fixed size compartments and said variable size compartments, channel shaped hangers clamped to (the outside) said outerside of one of (a) said side (wall) walls of said tray at spaced points, (and) said hangers having one leg fitting on the inner side of said side wall and a longer leg fitting on the outer side of said side wall, said hangers having outwardly inclined arms extending from (one) said longer leg of the (channel) hangers and a magnet bonded to a recess in the bottom of the tray, said recess enclosed by a threaded disc having a centrally located groove.

* * * * *